POWER CONTROL CIRCUIT

Filed March 1, 1966

INVENTOR
HENRY S. BORKOVITZ

BY Bair, Freeman & Molinare
ATTORNEYS 3,295,020

POWER CONTROL CIRCUIT

Henry S. Borkovitz, 1412 W. Thorndale Ave., Chicago, Ill. 60626

Filed Mar. 1, 1966, Ser. No. 530,982
3 Claims. (Cl. 317—33)

This application is a continuation-in-part of my co-pending application Serial No. 245,754, filed December 19, 1962 and entitled Power Control Circuit.

This invention relates to a power control circuit and more particularly to an electronic circuit utilizing semi-conductor rectifiers, or similar electrical valves, to control the flow of electric power to a load.

Electric power control circuits of the type to which the present invention relates have heretofore been proposed and have been used satisfactorily for controlling the supply of power to many different types of loads. Circuits of this type are more particularly described and claimed in my co-pending applications Serial No. 138,885, filed September 18, 1961, now U.S. Patent No. 3,102,226 issued August 27, 1963, and Serial No. 155,421 filed November 28, 1961, now abandoned.

Two difficulties have been encountered in such circuits, one of which occurs when the load is a transformer or similar inductive device due to the inrush of current to the load when power is initially supplied to the load. This creates a very high current flow and may damage the control circuit or cause a false overload indication thereon. The other difficulty is due to false overload indication in response to transients in the power supply. The principal object of the present invention is to provide a power control circuit in which these two difficulties are overcome.

Another object is to provide a power control circuit in which the rate of buildup of the controlling signal is limited by time delay devices, thereby limiting the rate at which the load current can increase. This will eliminate the possibility of damage due to initial inrush of current to a transformer or similar load.

Another object is to provide a power control circuit in which time delay means are provided in the overload control so that it cannot respond to transients of short duration.

The above and other objects and features of the invention will be more readily apparent from the following description when read in connection with the accompanying drawings, in which.

Figure 1:
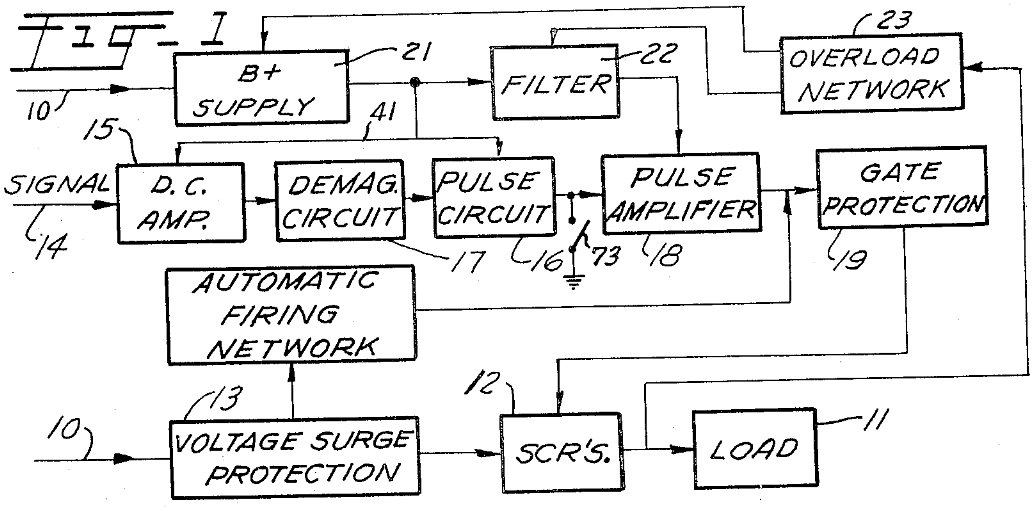
FIG. 1 is a block diagram of a circuit embodying the invention.

Referring first to the block diagram, the circuit is powered from a source 10 and supplies a load 11 through one or more semi-conductor rectifiers 12. The semi-conductor rectifiers are connected between the source and the load through a voltage surge protection circuit 13. Controlling signals are supplied from any suitable type of instrument responsive to the condition to be controlled through a connection 14 to a D.C. amplifier 15 which supplies a pulse circuit 16 through a de-magnetizing or time delay circuit 17. The pulses from the pulse circuit 16 are amplified in a pulse amplifier 18 and supplied to a gate protection unit 19 which is connected, as shown, to the semi-conductor rectifiers 12 to supply controlling pulses thereto.

The D.C. amplifier 15 and pulse circuit 16 are supplied with power from a B plus supply source 21 which also supplies a filter circuit 22 through which power is supplied to the pulse amplifier 18. An overload network 23, which is responsive to the load current, controls the B plus supply and the filter circuit 22 to make the pulse supply circuit inoperative in the event of overload.

Figure 2:
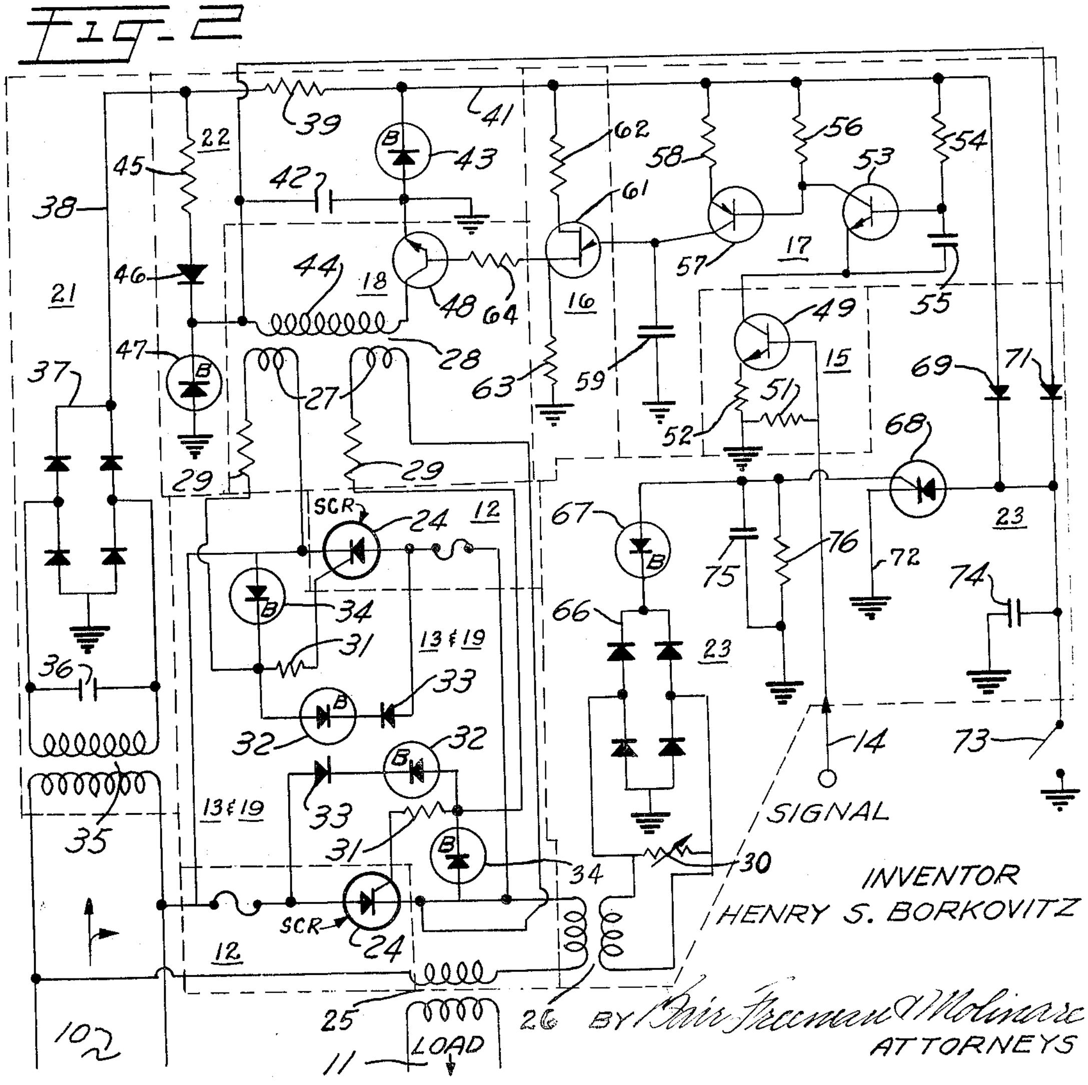
FIG. 2 is a circuit diagram.

The actual circuit, as shown diagrammatically in FIG. 2, includes a double semi-conductor rectifier unit for full phase utilization of an alternating current power supply. It will be understood that two such units could be employed, as disclosed in my Patent No. 3,102,226, and further that multiple phase power could be controlled by the provision of additional units for each of the phases.

The semi-conductor rectifier unit, as shown in FIG. 2, includes two semi-conductor control rectifiers 24 connected in parallel in opposing relationship with each other between one side of the power source 10 and the load 11. As shown, the other side of the power source is connected through a transformer 25 which supplies the load and through a current transformer 26 to the semi-conductor control rectifiers. Each of the rectifiers 24 is of a conventional construction, including current conductive electrodes between which the load current flows and a control or gating electrode which makes the rectifier conductive in one direction when a positive voltage pulse is supplied thereto and when a voltage of the correct phase is impressed across the current conductive electrodes. The semi-conductor rectifiers 24 are supplied with pulses from secondary windings 27 on a transformer 28 and which windings are connected respectively through resistors 29 and resistors 31 between the control electrodes and cathodes of the semi-conductor rectifiers. The transformer 28 is supplied with pulses by a control circuit to be described hereinafter to cause the semi-conductor rectifiers to fire at different phase positions thereby to control the amount of power transmitted to the load by them.

The semi-conductor rectifiers are protected against voltage surges by Zener diodes 32 connected in series with rectifiers 33 and with Zener diodes 34 in shunt across the semi-conductor rectifiers 24 with the point between diodes 32 and 34 being connected through the resistors 31 to the control electrodes of the semi-conductor rectifiers 24. In the event the voltage developed across either the semi-conductor rectifiers 24 should become sufficient to cause flow of current through the shunt circuit, a signal will be supplied to the control electrode of the semi-conductor rectifier 24 causing it to fire. The rectifier 24 thereupon becomes conductive regardless of the signal supplied thereto from the transformer 28 to prevent damage to the rectifier, the load normally being capable of absorbing small surge currents without damage. The Zener diodes 34 which as shown are connected across the transformer secondary windings 27 serve not only to bypass negative portions of the signal pulses so that the control electrodes will receive only positive voltage signals, but also function to limit the value of the positive voltage pulses.

The controlling pulses for the semi-conductor rectifiers 24 are supplied through a pulse control circuit 16 which may be powered by B+ supply circuit 21 derived from the source 10 through a transformer 35. A capacitor 36 is preferably connected across the secondary of the transformer to bypass surges and transients. The secondary of the transformer supplies a full wave rectifier circuit 37 which is connected at one side to ground and at the other side to a power lead 38 for the pulse supplying circuit. The line 38 is connected through a resistor 39 to a line 41 which comprises the source 21 of regulated voltage for the D.C. amplifier 15 and pulse circuit 16. The ground for the rectifier circuit 37 as well as the other grounds shown are a control circuit common and not a chassis ground.

The voltage on the line 38 is supplied to one side of the primary winding 44 of the transformer 28 through a resistor 45 and a rectifier 46, a Zener diode 47 connecting said one side of the primary winding 44 to ground to regulate the voltage supplied to the winding. The winding 44 is connected in a closed loop pulse amplifier circuit 18 with the capacitor 42 which filters the voltage to the pulse amplifier 18 and with a transistor or similar electrical valve 48 so that when the valve 48 is conducting current can flow in the loop, as described hereinafter.

The valve 48 is controlled in response to a signal supplied at the inlet connection 14 to vary the phase position at which pulses are supplied to the semi-conductor rectifiers thereby to control the phase position at which they will fire to control the power transmitted therethrough. For this purpose, the signal input lead 14 is connected to the control electrode of a transistor 49 of D.C. amplifier 15, a shunt resistor 51 being provided to establish a bias level. One of the current conducting electrodes of the transistor 49 is connected to ground through a resistor 52 and the other is connected to one of the current conducting electrodes of a transistor 53 forming a part of the demagnetizing or time delay circuit 17 to regulate the rate of buildup of the current supply. The control electrode of the transistor 53 is connected through a resistor 54 to the supply lead 41 and through a capacitor 55 to the common point between the transistors 49 and 53. The other current conducting electrode of the transistor 53 is connected to the supply lead 41 through a resistor 56 which is also connected to the control electrode of a transistor 57. The current conducting electrodes of the transistor 57 are connected respectively to the supply lead 41 through a resistor 58 and to ground through a capacitor 59. The point between transistor 57 and capacitor 59 is connected to the control electrode of a uni-junction transistor 61 of pulse circuit 16 which is connected to the supply lead 41 through resistor 62 and to ground through resistor 63. The point between the transistor 61 and resistor 63 is connected through a resistor 64 to the control electrode of the transistor 48 of the pulse amplifier 18.

In operation of this circuit, as the signal builds up on the lead 14 the transistor 49 of D.C. amplifier 15 will become conductive. The transistor 53 cannot become conductive until the capacitor 55 is charged to a predetermined voltage and in this way the transistor 53 and capacitor 55 form a time delay means 17 to limit the rate of buildup of the signal and hence the rate of buildup of the load current, after power is applied.

After the transistor 53 has become conductive, a voltage will be generated across the resistor 56 which is supplied to the control electrode of the transistor 57 to trigger it. As the transistor 57 becomes conductive, the capacitor 59 will be charged and when it reaches a predetermined voltage it will trigger the uni-junction transistor 61 of the pulse circuit 16. Flow through this transistor 61 will develop a voltage across the resistor 63 which is applied to the transistor 48 of pulse amplifier 16 to trigger it. As soon as the transistor 48 becomes conductive a pulse of current will flow through the transformer primary winding 44 of the gate protection circuit 19 to generate pulses in the secondary windings 27 which are transmitted to the semi-conductor rectifiers 24 to control them.

The overload protection circuit 23 is essentially similar to that more particularly described and claimed in my copending application Serial No. 155,421, now abandoned. As shown, it comprises a full wave rectifier 66 connected to the secondary of the current transformer 26, and to the loading resistor 30. One side of the full wave rectifier is connected to ground and the other side is connected through a Zener diode 67 to the control electrode of a semi-conductor controlled rectifier 68. The common terminal of the rectifier 68 is connected through a rectifier 69 to the power supply lead 41 and through a second rectifier 71 to the junction between the rectifier 46 and Zener diode 47. The other terminal of the rectifier 68 is connected to ground through a lead 72.

When the voltage across the rectifier circuit 66 exceeds the breakdown voltage of the Zener diode 67, the Zener diode 67 will transmit the voltage to the rectifier 68 which will then become conductive. The rectifier 68 will short circuit both the power supply lead 41 and the point of power supply to the transformer primary 44 so that under these conditions no pulses can be transmitted to the semi-conductor rectifiers 24 to make them conductive and the circuit will be shut down. To restart the circuit, a switch 73 having a capacitor 74 in parallel therewith and shunting the semi-conductor controlled rectifier 68 is temporarily closed to remove the voltage from the rectifier 68 so that it will again become non-conducting.

According to the present invention, time delay means are provided in the overload circuit to prevent it from responding to surges of transients produced from the power supply source. The capacitor 74 constitutes a part of such means and the remainder is made up of a capacitor 75 and resistor 76 connected in parallel to a point between the Zener diode 67 and the rectifier 68 and ground. Any transient pulses of short duration transmitted by the Zener diode 67 will be bypassed to ground through the capacitor 75 and resistor 76 and will not cause the rectifier 68 to fire. Thus false indications of overload due to short pulses or transients are eliminated.

While one embodiment of the invention has been shown and described herein, it will be understood that it is illustrative only and not to be taken as a definition of the scope of the invention, reference being had for this purpose to the appended claims.

What is claimed is:

1. A power control circuit comprising an electrical valve having current conductive electrodes and a control electrode, connection to the current conductive electrodes to impress a pulsating voltage thereacross, the valve becoming conductive when a predetermined voltage is applied to the control electrode and a voltage of predetermined value is impressed across the current conducting electrodes, a pulse circuit connected to the control electrode to supply actuating pulses thereto and including a source of power and means connected to the source of power and responsive to a controlling signal to produce the pulses, means responsive to the flow of current between the current conductive electrodes of the first named valve to generate an overload signal, means including an electrical valve responsive to the overload signal to incapacitate the source of power and the pulse producing means when the overload signal exceeds a predetermined value, and time delay means connected to the overload signal producing means to limit the rate of increase of the overload signal.

2. A power control circuit comprising an electrical valve having current conductive electrodes and a control electrode, connections to the current conductive electrodes to impress a pulsating voltage thereacross, the valve becoming conductive when a predetermined voltage is applied to the control electrode and a voltage of predetermined value is impressed across the current conducting electrodes, a pulse circuit connected to the control electrode to supply actuating pulses thereto and including a source of power and means connected to the source of power and responsive to a controlling signal to produce the pulses, means responsive to the flow of current between the current conductive electrodes of the first named valve to generate an overload signal, means including an electrical valve having a control element connected to the last named means and responsive to the overload signal when it exceeds a predetermined value to incapacitate the power source and the pulse producing means, and capacitance and resistance elements in parallel shunting the last named control element to limit the rate of buildup of the overload signal thereon.

3. A power control circuit comprising an electrical valve having current conductive electrodes and a control electrode, connections to the current conductive electrodes to impress a pulsating voltage thereacross, the valve becoming conductive when a predetermined voltage is applied to the control electrode and a voltage of predetermined value is impressed across the current conducting electrodes, a pulse circuit connected to the control electrode to supply actuating pulses thereto and including means responsive to the value of a controlling signal to control the point in a pulsating voltage cycle at which a pulse is supplied to the control electrode, time delay means connected to said last named means to limit the rate of buildup of power to the load, after power is applied to the unit, means responsive to the flow of current between the current conductive electrodes of the first named valve to generate an overload signal, means including an electrical valve responsive to the overload signal to incapacitate the source of power and the pulse producing means when the overload signal exceeds a predetermined value, and time delay means connected to the overload signal producing means to limit the rate of increase of the overload signal.

References Cited by the Examiner

UNITED STATES PATENTS

| | | | |
|---|---|---|---|
| 3,132,287 | 5/1964 | Yarbrough | 317—33 |
| 3,146,356 | 8/1964 | Kidwell et al. | 307—88.5 |
| 3,165,649 | 1/1965 | Ault | 307—88.5 |
| 3,181,032 | 4/1965 | Myers | 317—33 |

MILTON O. HIRSHFIELD, *Primary Examiner.*

J. D. TRAMMELL, *Assistant Examiner.*